March 6, 1951 P. M. OLMAN 2,543,929
POWER TRANSLATION MECHANISM
Filed Oct. 31, 1944 2 Sheets-Sheet 1
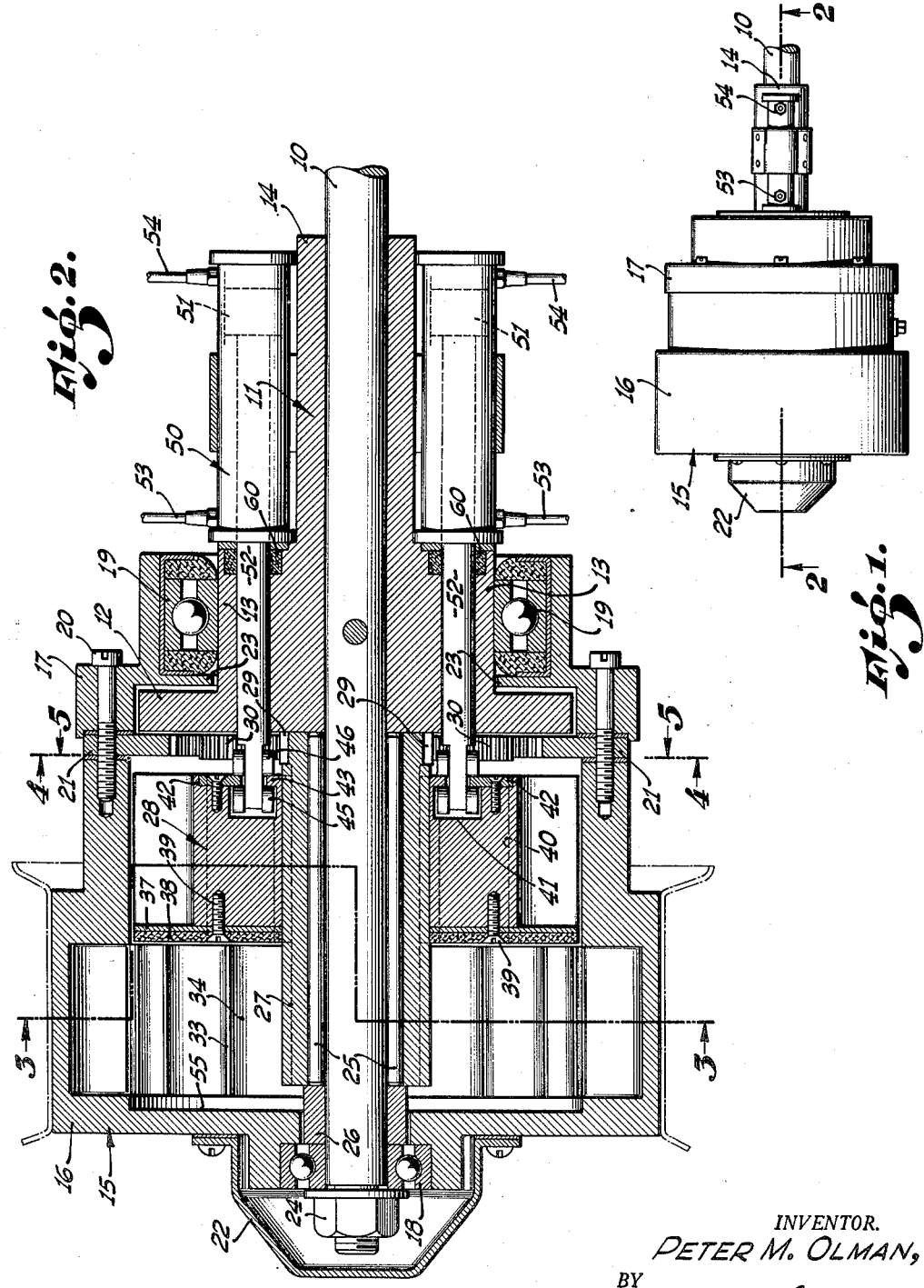
INVENTOR.
PETER M. OLMAN,
BY
ATTORNEY.

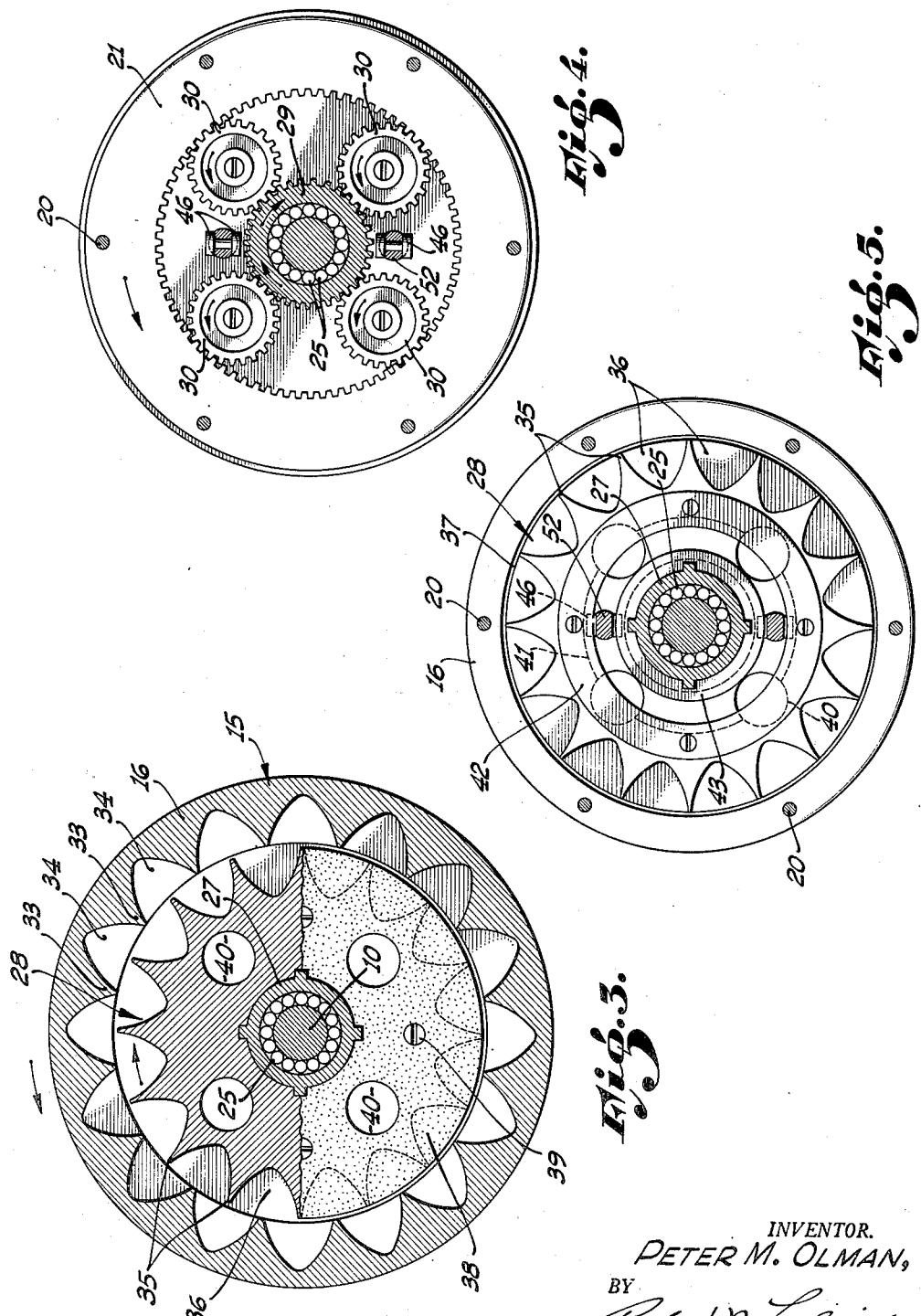

Patented Mar. 6, 1951

2,543,929

UNITED STATES PATENT OFFICE 2,543,929

POWER TRANSLATION MECHANISM

Peter M. Olman, Los Angeles, Calif.

Application October 31, 1944, Serial No. 561,190

31 Claims. (Cl. 192—58)

1

My invention relates generally to power transmission mechanisms and more particularly to dynamic fluid brakes and fluid couplings of the type in which fluid is used as the power transfer medium.

Although the mechanism of my invention has a very wide range of uses, I have illustrated it as applied to the construction of a dynamic fluid brake that is particularly valuable in those cases where large masses traveling at high speeds must be quickly brought to a stop, such as in the case of large aircraft, railroad trains, trucks, drilling pipe being lowered into a well, and other cases where the momentum is large.

The principal object of my invention is to provide a power translating mechanism of this character which is not only highly efficient but is simple in construction and is strongly resistant to wear and tear.

It is another object of my invention to provide a power translation mechanism which is equally efficient when rotated in either direction and which is, therefore, particularly well suited for use in vehicles and other bodies which are adapted to move in two directions.

A further object of my invention is to provide a brake having the foregoing characteristics and in addition having means for effectively locking the brakes when the moving bodies have been brought to rest.

An important feature of the brake of my invention is that its effective braking power is a function of the speed of rotation of the body being braked, whereby the higher the speed of the body, the greater the effective braking power available.

Another advantage of my mechanism is that it can be easily operated by remote control, either through mechanical or hydraulic actuating means, thereby making the device universal in its application.

These and other objects and advantages of my invention will become apparent from the following description of a preferred form thereof, and from the accompanying drawings, in which:

Fig. 1 is a longitudinal view of a complete brake mechanism embodying my invention, Fig. 2 is a central longitudinal section of the brake, taken along the line 2—2 of Fig. 1, and showing a wheel rim in phantom lines, Fig. 3 is an end elevational view partially in section, taken on the line 3—3 of Fig. 2.

Fig. 4 is a cross-section taken on the line 4—4 of Fig. 2, looking in the direction of the arrows 4—4, and Fig. 5 is a cross-section taken on the same plane as Fig. 4, but looking in the other direction as indicated by the arrows 5—5.

Referring now to the drawings, and particularly to Figs. 1 and 2 thereof, the numeral 10 indicates an axle which may be rigidly mounted on a supporting frame not shown. The numeral 11 indicates a stationary body member integral with axle 10 having one end enlarged to form a flange 12, its center portion reduced to form a shoulder 13, and its other end 14 still further reduced in diameter. An outer rotary member 15 comprising a drum 16 secured to a bearing flange 17 is rotatably mounted on axle 10 by means of an anti-friction bearing 18 disposed on the outer end of the axle and an inner anti-friction bearing 19 mounted between flange 17 and shoulder 13 of body member 11. Flange 17 and drum 16 are secured together by suitable means, such as bolts 20 which pass through a ring gear 21 disposed at the open end of drum 16. The rotary member 15 is prevented from axial movement along axle 10 by reason of an annular flange 23 which with ring gear 21 partially encloses the flange 12 of body member 11. Bearing 18 is held in place on axle 10 by a nut 24 in conventional manner and a dust cap 22 is provided in conventional manner.

A plurality of rollers 25 are mounted closely adjacent to axle 10 and parallel thereto with their inner ends journaled in the outer face of body member 11 and their outer ends journaled in a bearing block 26 secured to the axle just inside of bearing 18. A sleeve 27 is rotatably mounted on rollers 25 and is confined between bearing block 26 and body member 11 to prevent axial movement. An inner rotary member which I term the rotor 28 is keyed to sleeve 27 for rotative movement therewith, but is axially movable with respect thereto. Sleeve 27 is provided at its inner end with a sun gear 29 which meshes with four planetary pinion gears 30 rotatably mounted on the outer face of body flange 12. Gears 30 also engage ring gear 21, so that rotation of drum 16 and ring gear 21 in one direction causes rotation of sleeve 27 and rotor 28 in the other direction.

As seen best in Figs. 3 and 5, the drum 16 is provided on its inner periphery with a plurality of blades 33 spaced apart to provide pockets 34 therebetween. The outer periphery of rotor 28 is likewise provided with a plurality of blades 35, having pockets 36 therebetween, the blades and pockets of the two members preferably being substantially of the same shape and size. The over-all diameter of the rotor body and blades is but slightly less than the inner diameter of the drum blades so that there is almost a complete cutoff between them when they pass one another. While the blades may be formed of various shapes, I prefer to form them substantially symmetrically about their radii as shown, so that they will be equally effective upon rotation in either direction.

The rotor 28 has a circular plate 37 on the end which faces into drum 16 to which is secured a facing 38 of suitable braking material such as cork or the like. Both plate and brake facing are secured to the rotary member 28 by convenient means such as screws 39. The chamber formed by drum 16 is filled with oil or other suitable fluid, and the rotor 28 is preferably provided with longitudinal passageways 40 to permit free axial movement thereof through the fluid.

To facilitate axial movement of rotor 28, I provide it with an annular groove or trackway 41, partially covered by an annular plate 42 which cooperates with a shoulder 43 on the end of rotor 28 to provide a partial covering or enclosure of groove 41.

Secured to the reduced portion 14 of body member 11 are one or more cylinders 50 provided with pistons 51 therein having piston rods 52 extending through the heads of the cylinders. Fluid pressure lines 53 and 54 feed into opposite ends of cylinders 50 for actuation of the pistons 51 in either direction. Body member 11 is bored to receive the piston rods 52 which extend therethrough and project into the annular groove 41 of rotary member 28, suitable packing glands 60 being provided to maintain a fluid seal around the rods. Each piston rod 52 is provided with a pair of spaced rollers 45 and 46 rotatable on pins laterally supported in the outer ends of the rods. Rollers 45 are adapted to ride within the annular groove 41 being slightly smaller than said groove to permit free movement therein, thus allowing the rollers to bear against the inner face of plate 42 when the rods 52 are pulled outwardly. Rollers 46 are adapted to bear against the outer face of plate 42 when the rods 52 are pushed inwardly. Consequently, while rotor 28 is freely rotatable with respect to said rods and rollers, axial movement of the pistons and piston rods will cause axial movement of rotor through the medium of rollers 45 or 46 as the case may be. It will be understood, of course, that any suitable number of piston rod assemblies may be provided, depending upon the size of the units and the forces to be transmitted.

It will be apparent that as the inner rotary member 28 is moved along axle 10 on sleeve 27 into that portion of the chamber of drum 16 provided with blades 33, the fluid in the chamber will oppose relative rotation of the members because of blades 33 and 35, it being remembered that rotation of drum 16 in one direction causes rotation of rotary member 28 in the other direction through the planetary gear train previously described. As rotor 28 progresses further into the bladed portion of the chamber of drum 16, a greater area of their respective blades will become justapositioned and so effective to increase the braking resistance. This resistance is compounded by reason of the opposite rotation of the two members so that for any given speed of rotation of drum 16, the relative rotary speed between the rotating members is double what it would be if one of the members were stationary. Furthermore, it will be apparent that the higher the speed of relative rotation between the members 16 and 28, the greater will be the resistance to rotation offered by the fluid.

In the operation of my apparatus, the members 15 and 28 are normally in the position shown in Fig. 2, whereby there is relatively no resistance to rotation of one member with respect to the other. When rotary motion is imparted to the member 15, such as would be the case when an aircraft lands or when a vehicle is traveling with its wheels in engagement with the ground, rails, etc., rotation of the drum 16 and ring gear 21 will produce counter-rotation of rotary member 28. However, substantially no resistance to relative rotation is effected so long as the member 28 remains in its retracted position shown in Fig. 2, since the fluid in each portion of the chamber is substantially separate from that in the other portion by reason of the plate 37, there being but slight resistance developed due to skin friction on brake facing 38 and the holes 40. However, when presure fluid is introduced into cylinders 50 through inlets 54, the pistons 51 and rods 52 are forced outwardly forcing the rotary member 28 into the chamber of drum 16. This causes partial overlapping or concentricity of blades 33 and 35 which because of the oil in the chamber develop resistance to rotation. If but a slight braking effect is desired, the member 28 is moved only through a part of its travel so as to provide partial overlapping of the blades but if full braking effect is desired, the rotary members are fully telescoped to give the maximum braking power available. When the rotary member 15 has substantially come to rest, rotor 28 is moved to its extreme position causing brake facing 38 to engage the inner wall 55 of drum 16 to lock the drum in rest position. When it is desired to release the brake, the pressure is released in line 54 and created in line 53 to return piston 51 and its associated parts including rotor 28 to their normal or inoperative position.

By reason of the rollers 45 and 46 being in rolling engagement with the ring plate 42 and lug 43, rotation of the member 28 and sleeve 27 about axle 10 is not impeded, and longitudinal or axial movement can be readily imparted to member 28 without undue effort. Thus a minimum of power is needed on piston 51 to effect full application of the brakes, the holes 40 in the member 28 permitting relatively easy movement of the member into the chamber fluid.

While the particular apparatus herein shown and described in detail is fully capable of attaining the objects and providing the advantages hereinbefore stated, it is to be understood that it is merely illustrative of the presently preferred embodiment of my invention, and that I do not mean to limit myself to the details of construction or design herein shown.

I claim:

1. In a power translation mechanism the combination of: means forming a fluid chamber; a pair of telescopically disposed bladed members mounted for relative rotation in said chamber with their said blades opposed and in engagement with the fluid in said chamber; means connecting said members and adapted to cause them to rotate in opposite directions; and means for varying the relative axial positions of said members to thereby vary the fluid drag between them.

2. In a power translation mechanism the combination of: means forming a fluid chamber; including an internally bladed member; an externally bladed member rotatably mounted within said first member with its blades adapted to be opposed to the blades of said first member and with a radially extending element at one end of said blades to prevent the axial discharge of fluid from said second member; and means for varying the axial spacing of said members to thereby vary the fluid resistance to relative rotation therebetween.

3. In a power translation mechanism the combination of: means forming a fluid chamber including a rotatable member having blades on its inner periphery; a second member having blades on its outer periphery and rotatably mounted in said chamber within said first member with its blades adapted to be opposed to the blades of said first member; a gear train connecting said members so that rotation of one member in one direction causes rotation of the other member in the opposite direction; and means for varying the axial spacing of said members to thereby vary the fluid resistance to rotation therebetween.

4. In a power translation mechanism the combination of: a first rotary member forming a fluid chamber and having a series of blades on its inner periphery; a second rotary member coaxially mounted within said first member and provided with blades on its outer periphery adapted to oppose said first mentioned blades when rotated within said chamber; means interconnecting said members so that they are caused to rotate in opposite directions; and means for varying the axial spacing of said members to vary the fluid drag between said blades and thereby vary their resistance to relative rotation.

5. In a power translation mechanism the combination of: an axle; a fluid containing drum rotatably mounted on said axle and provided with blades on its inner periphery; a cylindrical member mounted on said axle within said drum and movable axially thereof, said member being provided with blades on its outer periphery and a radially extending element at the end of said blades to prevent the axial discharge of fluid from said cylindrical member; and means for moving said inner member axially of said drum to vary the overlap of said blades to thereby vary the fluid drag between said drum and said inner member.

6. In a power translation mechanism the combination of: an axle; a hollow drum rotatably mounted on said axle and provided with lateral blades on a portion of its inner periphery, said drum being adapted to be substantially filled with fluid; a rotor within said drum provided with lateral blades on its outer periphery, said rotor being slidable on said axle within said fluid; a gear train interconnecting said drum and rotor so that rotation of the former in one direction causes the latter to rotate in the opposite direction; and means for moving said rotor axially of said drum to bring its blades concentric with those of said drum.

7. In a power translation mechanism the combination of: an axle; a hollow drum rotatably mounted on said axle and provided with lateral blades on a portion of its inner periphery, said drum being adapted to be substantially filled with fluid; a rotor within said drum provided with lateral blades on its outer periphery, said rotor being slidable on said axle; a gear train interconnecting said drum and rotor so that rotation of the former in one direction causes the latter to rotate in the opposite direction; and means for moving said rotor axially of said drum to bring its blades concentric with those of said drum, said means comprising a plurality of rods extending from said rotor, and fluid operated piston means for moving said rods.

8. In a power translation mechanism the combination of: an axle; a hollow drum rotatably mounted on said axle and provided with lateral blades on a portion of its inner periphery, said drum being adapted to be substantially filled with fluid; a rotor within said drum provided with lateral blades on its outer periphery, said rotor being slidable on said axle; a gear train interconnecting said drum and rotor so that rotation of the former in one direction causes the latter to rotate in the opposite direction; and means for moving said rotor axially of said drum to bring its blades concentric with those of said drum, said means comprising a plurality of rods extending from said rotor, and fluid operated piston means for moving said rods, said rods being connected to said rotor by means of rollers permitting rotation of said rotor free of said rods.

9. In a power translation mechanism the combination of: an outer rotary member provided with blades on its inner periphery; an inner rotary member coaxially mounted within said outer member and provided with blades on its outer periphery and a radially projecting element at the end of said blades, said inner member being axially movable with respect to said outer member, the blades of said outer member being relatively close to the blades of said inner member, and said radial element preventing the axial discharge of a fluid from said inner member into the chamber formed by the outer member; and means extending axially outwardly from said inner member adapted to move the same axially.

10. In a power translation mechanism the combination of: an outer rotary member provided with blades on its inner periphery; an inner rotary member coaxially mounted within said outer member and provided with blades on its outer periphery and a radially projecting element at the end of said blades, said inner member being axially movable with respect to said outer member, the blades of said outer member being relatively close to the blades of said inner member, and said radial element preventing the axial discharge of a fluid from said inner member into the chamber formed by said outer member; a ring gear rotatable with said outer member; a sun gear rotatable with said inner member; intermediate planetary gears meshing with said ring gear and said sun gear to cause them to rotate in opposite directions; and means extending axially outwardly from said inner member adapted to move the same axially.

11. In a power translation mechanism the combination of: an outer rotary member provided with blades on its inner periphery; an inner rotary member coaxially mounted within said outer member and provided with blades on its outer periphery and a radially projecting element at the end of said blades, said inner member being axially movable with respect to said outer member, the blades of said outer member being relatively close to the blades of said inner member, and said radial element preventing the axial discharge of a fluid from said inner member into the chamber formed by said outer member; means attached to said inner member and extending therefrom adapted to move said inner member axially but permitting free rotation thereof; and power cylinder means for operating said connecting means to vary the position of said inner member axially with respect to said outer member.

12. In a power translation mechanism the combination of: an axle; a drum rotatably mounted on said axle and provided with blades on a portion of its inner periphery, said drum forming a chamber adapted to hold fluid; a sleeve rotatably mounted on said axle within said drum and provided with a gear fast thereto; a cylindrical rotor keyed to said sleeve to rotate therewith but axially movable thereon, said rotor being provided with blades on its outer periphery closely adjacent to the blades of said drum; a ring gear on said drum adapted to rotate therewith; intermediate gears engaging said ring gear and said sleeve gear causing them to rotate in opposite directions; and a plurality of rods slidably attached to said rotor and extending out from said chamber adapted to move said rotor axially of said drum.

13. In a power translation mechanism the combination of: an axle; a drum rotatably mounted on said axle and provided with blades on a portion of its inner periphery, said drum forming a chamber adapted to hold fluid; a sleeve rotatably mounted on said axle within said drum and provided with a gear fast thereto; a cylindrical rotor keyed to said sleeve to rotate therewith but axially movable thereon, said rotor being provided with blades on its outer periphery closely adjacent to the blades of said drum; a ring gear on said drum adapted to rotate therewith; intermediate gears engaging said ring gear and said sleeve gear causing them to rotate in opposite directions; a plurality of rods slidably attached to said rotor and extending out from said chamber adapted to move said rotor axially of said drum; a piston attached to each of said rods; and power cylinder means for operating said pistons.

14. In a power translation mechanism the combination of: an axle; a fluid containing cylindrical member mounted on said axle and provided with blades on its inner periphery; a cylindrical member mounted on said axle within said first cylindrical member and, provided with blades on its outer periphery and a radially extending element at the end of said blades to prevent the axial discharge of a fluid from said inner cylindrical member, one of said members being rotatable, and means for moving one of said cylindrical members axially of the other to vary the overlap of said blades to thereby vary the fluid drag between said members.

15. In a power translation mechanism the combination of: an axle; a fluid containing cylindrical member rotatably mounted on said axle and provided with blades on its inner periphery; a cylindrical member rotatably mounted on said axle and provided with blades on its outer periphery; means interconnecting said cylindrical members so that they are caused to rotate in opposite directions; and means for moving one of said cylindrical members axially of the other to vary the overlap of said blades to thereby vary the fluid drag between said members.

16. In a power translation mechanism the combination of: an outer rotary member provided with blades on its inner periphery; an inner rotary member coaxially mounted within said outer member, provided with blades on its outer periphery and a radially extending element at one end of said blades to prevent the axial discharge of a fluid from said inner rotary member, one of said members being axially movable with respect to the other, the blades of said outer member being relatively close to the blades of said inner member; and means adapted to move said axially movable member axially to vary the axial spacing of said members.

17. In a power translation mechanism the combination of: an axle; a fluid containing cylindrical member rotatably mounted on said axle and provided with a plurality of cells on its inner periphery; a cylindrical member rotatably mounted on said axle and provided with a plurality of cells on its outer periphery; means interconnecting said cylindrical members so that they are caused to rotate in opposite directions; and means for moving one of said cylindrical members axially of the other to vary the overlap of said cells to thereby vary the fluid drag between said members.

18. In a power translation mechanism the combination of: two coaxial rotatable members, one of said members being axially slidable relative to the other member to bring said members into and out of telescoping relationship, irregular surfaces upon said members positioned as to be opposed with said members telescoped, a body of fluid in the space between said members, frictional engaging surfaces on said members positioned as to make contact in said body of fluid with said members completely telescoped, and means to shift said one member axially to and from telescoped relationship with the other member.

19. The structure defined in claim 18 characterized in that the engaging surface on said axially slidable member forms a barrier between the bodies of fluid contacted by the irregular surfaces of said members when axially spaced and out of telescoped relationship.

20. In a power translation mechanism, the combination of: an outer member forming a fluid chamber and having a plurality of spaced fluid-engaging pockets on its inner periphery, an inner member having a plurality of spaced fluid-engaging pockets on its outer periphery, an end of said last-mentioned pockets being closed to prevent the axial discharge of a fluid therefrom, said members being coaxially mounted for relative rotation, said pockets being adapted to cooperate to produce fluid drag between said members, and means for varying said fluid drag between said members.

21. In a power translation mechanism, the combination of: an outer member forming a fluid chamber and having a plurality of spaced fluid-engaging pockets on its inner periphery, an inner member having a plurality of spaced fluid-engaging pockets on its outer periphery, an end of said last-mentioned pockets being closed to prevent the axial discharge of a fluid therefrom, said members being coaxially mounted for relative rotation, said pockets being adapted to cooperate to produce fluid drag between said members, and means for varying the overlapping relationship of said pockets to thereby vary their cooperative effect and said fluid drag.

22. In a power translation mechanism, the combination of: an outer member forming a fluid chamber and having a plurality of spaced fluid-engaging pockets on its inner periphery, an inner member having a plurality of spaced fluid-engaging pockets on its outer periphery, an end of said last-mentioned pockets being closed to prevent the axial discharge of a fluid therefrom, said members being coaxially mounted for relative rotation, said pockets being adapted to cooperate to produce fluid drag between said members, and axially movable means for adjusting the net effective area of said pockets to thereby vary said fluid drag.

23. In a power translation mechanism, the combination of: a fluid containing outer member having a plurality of spaced fluid-engaging pockets on its inner periphery, an inner member having a plurality of spaced fluid-engaging pockets on its outer periphery, one end of said last-mentioned pockets being closed to prevent the axial discharge of a fluid therefrom, said members being coaxially mounted for relative rotation, said pockets being adapted to cooperate to produce fluid drag between said members, and means for varying the axial position of said members to vary said fluid drag.

24. In a power translation mechanism, the combination of: an outer member having a plurality of spaced fluid-engaging pockets on its inner periphery, an inner member having a plurality of spaced fluid-engaging pockets on its outer periphery, said members being coaxially mounted for relative rotation, said pockets being adapted to cooperate to produce fluid drag between said members, means for varying the axial position of said members to vary said fluid drag, and means interconnecting said members whereby rotation of one of them causes opposite rotation of the other.

25. In a power translation mechanism, the combination of: an outer member having a plurality of spaced fluid-engaging pockets on its inner periphery, an inner member having a plurality of spaced fluid-engaging pockets on its outer periphery, said members being coaxially mounted for relative rotation, said pockets being adapted to cooperate to produce fluid drag between said members, axially movable means for adjusting the net effective area of said pockets to thereby vary said fluid drag, and means interconnecting said members whereby rotation of one of them causes opposite rotation of the other.

26. In a power translation mechanism, the combination of: an outer member provided with fluid constraining means on its inner periphery, an inner member provided with fluid constraining means on its outer periphery, said members being co-axially mounted for relative rotation and for relative axial displacement, and means for varying the relative axial position of said members, said members being interconnected whereby rotation of one causes reverse rotation of the other.

27. A power translation mechanism which includes: a fluid-containing outer member having an irregular internal surface; an inner member having an irregular external surface, said irregular surfaces cooperating with said fluid for the transmission of power between said inner and outer members, said members being rotatable with respect to one another; cylindrical means within said outer member axially movable with respect to said inner member to encircle the latter at a minimum distance therefrom, forming a chamber having a smooth interior which substantially prevents the transmission of power between said inner member and said outer member; and radial means at an end of said inner member that prevents the axial discharge of fluid from said inner member.

28. A power translation mechanism which includes: a rotatable fluid chamber having circumferentially arranged blades therein; a rotor within said chamber provided with exteriorly circumferentially arranged blades cooperable with said first-mentioned blades for the transmission of power therebetween; a shaft rotatably and slidably supporting said rotor; a rod slidably extending into said chamber; spaced rollers connecting said rod to said rotor to transmit an axial force to the latter without interfering with the rotation thereof; and means positioned exteriorly of said chamber for actuating said rod.

29. A power translation mechanism which includes: an outer rotary member provided with blades on its inner periphery, said member being adapted to be substantially filled with fluid; a rotor within said member provided with blades on its outer periphery, said rotor being axially slidable with respect to said outer member for varying the degree of overlapping of said two sets of blades; and means for moving said rotor axially of said member, said means comprising a plurality of rods extending from said rotor and having spaced rollers connecting said rods to said rotor to transmit an axial force to the latter without interfering with the rotation thereof, and fluid operated piston means for moving said rods.

30. A power translation mechanism which includes: means forming a fluid chamber including a rotatable member having blades on its inner periphery; a second member having blades on its outer periphery and rotatably mounted in said chamber within said first member with its blades adapted to be opposed to the blades of said first member; gear means causing the rotation of one of said members in one direction by the rotation of the other of said members in the opposite direction; and means for varying the axial spacing of said members to thereby vary the fluid resistance to rotation therebetween.

31. A power translation mechanism which includes: an axle; a fluid-containing cylindrical member rotatably mounted on said axle and provided with a plurality of cells on its inner periphery; a cylindrical member rotatably mounted on said axle and provided with a plurality of cells on its outer periphery; gear means causing the counter-rotation of said cylindrical members so that one of said members is rotated in one direction by the rotation of the other of said members in the opposite direction; and means for moving one of said cylindrical members axially of the other to vary the overlap of said cells to thereby vary the fluid drag between said members.

PETER M. OLMAN.

REFERENCES CITED

The following references are of record in the file of this patent:

UNITED STATES PATENTS

| Number | Name | Date |
|---|---|---|
| 1,238,447 | Severy | Aug. 28, 1917 |
| 1,672,232 | Saives | June 5, 1928 |
| 2,241,189 | Dick | May 6, 1941 |
| 2,280,897 | Denman | Apr. 28, 1942 |

FOREIGN PATENTS

| Number | Country | Date |
|---|---|---|
| 463,843 | Great Britain | Apr. 7, 1937 |
| 466,436 | Great Britain | May 28, 1937 |
| 780,441 | France | Apr. 26, 1935 |